United States Patent [19]

Tuffias et al.

[11] 3,726,574

[45] Apr. 10, 1973

[54] FERROHYDRODYNAMIC LOW-FRICTION BEARING WITH VOLUME COMPENSATION

[75] Inventors: Robert H. Tuffias, Costa Mesa; Harry D. Larson, Northridge, both of Calif.

[73] Assignee: Litton Systems, Inc., Beverly Hills, Calif.

[22] Filed: Aug. 13, 1971

[21] Appl. No.: 171,692

[52] U.S. Cl. ..........................308/36.3, 277/80, 308/9

[51] Int. Cl.............................F16c 33/74, F16c 32/00

[58] Field of Search.......................308/9, 1, 10, 36.3; 277/80

[56] References Cited

UNITED STATES PATENTS

| | | | |
|---|---|---|---|
| 3,439,961 | 4/1969 | Stiles | 308/9 |
| 3,097,853 | 7/1963 | McHugh | 277/80 |
| 3,612,630 | 10/1971 | Rosensweig | 308/10 |
| 3,620,584 | 11/1971 | Rosensweig | 277/80 |

FOREIGN PATENTS OR APPLICATIONS

| | | | |
|---|---|---|---|
| 783,881 | 10/1957 | Great Britain | 277/80 |

*Primary Examiner*—Charles J. Myhre
*Assistant Examiner*—Barry Grossman
*Attorney*—Alan C. Rose et al.

[57] ABSTRACT

A self-contained, full film hydrodynamic bearing is provided utilizing (1) the hydrodynamic properties of a ferrofluid (colloidal suspension of magnetic particles) to produce support pressures in the bearing by an applied viscous pumping action, and (2) the magnetic properties of the ferrofluid to retain the fluid within the bearing where the bearing retains the ferrofluid over a wide temperature range and concomitantly compensates for ferrofluid expansion and contraction.

19 Claims, 4 Drawing Figures

PATENTED APR 10 1973

3,726,574

FERROHYDRODYNAMIC LOW-FRICTION BEARING WITH VOLUME COMPENSATION

BACKGROUND OF THE INVENTION

Low-friction bearings are critical to the operation of certain machine systems, particularly sensitive inertial instruments.

Conventionally, ball bearings have provided low-friction supports but as the development of machine systems progressed, improved bearings were required with quiet running characteristics and long operating life. Since ball bearings could not always satisfy these requirements, low-friction bearings were developed that employ a fluid medium or lubricant, which can be either a liquid or a gas, for the support of an applied load.

However, a requirement continued to exist for improved liquid-lubricant, low-friction bearings that overcome the prior art problems both of conventional ball bearings and of gas bearings while combining the most attractive features of both bearing system.

Such a liquid-lubricant, low-friction bearing has been developed and disclosed in Ser. No. 171,691, filed 8/13/71 for a "Ferrohydrodynamic Low-friction Bearing," and assigned to the same assignee as the present invention. The improved ferrohydrodynamic low-friction bearing of the present invention is based upon the principles of operation of this ferrohydrodynamic bearing as disclosed therein.

Operation of the ferrohydrodynamic, low-friction bearing, as disclosed in the copending application, over a wide temperature range requires compensation for ferrofluid expansion and contraction so that the ferrofluid will not be forced out at higher temperatures, either operating temperatures or production outgassing temperatures, and gas will not be admitted at lower temperatures.

OBJECTS OF THE INVENTION

Accordingly, it is an object of the invention to provide a new and improved liquid lubricant, low-friction bearing, and more particularly a new and improved ferrohydrodynamic low-friction bearing.

It is an object of the invention to provide a ferrohydrodynamic bearing having fluid lubricant retained in the bearing over a wide temperature range.

It is an object of the invention to provide a ferrohydrodynamic bearing having volume compensation for an incompressible fluid lubricant over a wide temperature range.

It is an object of the invention to provide a ferrohydrodynamic bearing that retains a fluid lubricant during outgassing of the lubricant.

It is an object of the invention to provide a ferrohydrodynamic bearing that minimizes loss of lubricant during vacuum operation.

SUMMARY OF THE INVENTION

Briefly, in accordance with one form of the invention, a new and improved ferrohydrodynamic low-friction bearing is provided having a bearing assembly that includes at least first and second members for the support of a load, and a magnetizable fluid having a colloidal suspension of magnetic particles that develops a lubricant film contact with the first and second members. The bearing has a magnetic seal and volume compensator that acts upon and retains the magnetizable fluid so that the developed lubricant film contact with the first and second members is maintained without leakage of the fluid. Thus, the magnetizable fluid, the magnetic seal, and the volume compensator coact and develop a zero-leakage fluid seal in the bearing over a wide temperature range.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

DESCRIPTION OF THE INVENTION

Figure 1:
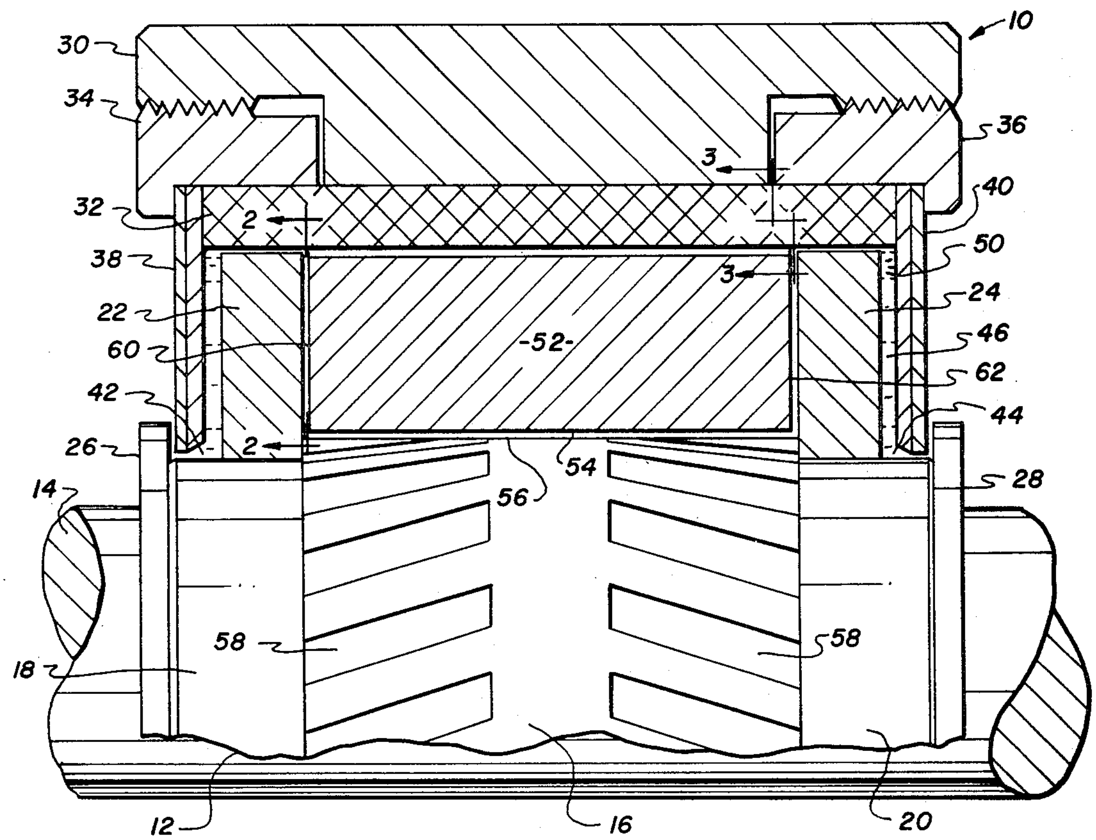
FIG. 1 is a sectional view, partly broken away, of one form of ferrohydrodynamic bearing of the invention.

Referring to FIG. 1, a spool bearing assembly 10 has a ferromagnetic journal member 12 fixed to or an integral part of a rotatable shaft 14 and rotatable therewith. The journal member 12 has an intermediate land portion 16 suitably formed between journal and end portions 18 and 20. Non-magnetic thrust pad members 22 and 24 are respectively positioned on and connected to journal end portions 18 and 20, and are longitudinally spaced apart by the intermediate land portion 16 of the journal member 12. The thrust pad members 22 and 24 are rotatable with the journal member 12. A pair of flanged members 26 and 28 are respectively positioned in an abutting relationship with the journal end portions 18 and 20, and are connected thereto so that the flange members are rotatable with the journal member 12. The non-magnetic flange members 26 and 28 extend outwardly beyond the journal end portions 18 and 20 for the purpose of high temperature sealing of the spool bearing assembly 10 when the bearing is stationary as described hereinafter in greater detail. The foregoing components are rotatable with the shaft 14 and comprise the rotating or rotor portion of the bearing assembly 10 as illustrated by FIG. 1.

The spool bearing assembly 10 of FIG. 1 has a non-magnetic support member 30 which can be connected to or be an integral part of a housing member (not shown). A magnet 32, which is symbolized by double cross-hatching to represent either a conventional permanent magnet or a conventional electromagnet, is positioned within the support member 30 and retained therein by similar non-magnetic threaded clamp nut members 34 and 36 that are threaded into adjustable engagement with support member 30. The clamp nut members 34 and 36, respectively, can be adjusted to limit the travel of bimetallic, ferromagnetic pole shoe members 38 and 40 as described hereinafter in greater detail.

The inwardly extending and bimetallic pole shoe members 38 and 40 develop a desired path for the magnetic flux field which is set up by the magnet 32 and further act to concentrate the magnetic flux at respective gaps 42 and 44 which are fluid filled during operation of the bearing assembly. The bimetallic pole shoe members 38 and 40 also act, in accord with conventional bimetallic elements, to compensate for the expansion and contraction of a ferromagnetic fluid 46, which fills a chamber 50 generally bounded by the gaps 42 and 44, over a wide temperature range. That is, the bimetallic pole shoe members 38 and 40, which can be bimetallic washer members, expand outwardly toward the flange members 26 and 28, respectively, with increasing temperature so that the change in the volume of the chamber 50 equals the change in ferromagnetic fluid volume caused by thermal expansion. The bimetallic pole shoe members 38 and 40, conversely, expand inwardly away from the flange members 26 and 28 with decreasing temperature to compensate for ferromagnetic fluid volume contraction. The extent of temperature imposed deflection of the bimetallic pole shoe members 38 and 40 can be controlled within limits by the selected adjustment of the clamp nut members 34 and 36 relative to the respective pole shoe members.

The magnet 32 of the bearing assembly 10 of FIG. 1 develops a magnetic seal at gap 42 between the outer surface of journal end portion 18 and the pole shoe member 38. Similarly, a magnetic seal is developed at gap 44 between the journal end portion 20 and the pole shoe member 40. The magnetic seals are effected by the developed magnetic forces which constrain the ferromagnetic fluid to remain in the high magnetic field gradient region of the gaps.

The ferromagnetic fluid 46 has magnetic particles of subdomain size colloidally dispersed in a liquid carrier. A typical magnetic particle size is 100 Angstroms ($4 \times 10^{-7}$ in.), so that thermal agitation prevents the particles from settling or separating under the action of gravity or strong magnetic fields; that is, Brownian movement. The ferromagnetic fluid 46 can have different liquid bases; for example, water, kerosene, silicone oil, etc. One limitation for the choice of a carrier liquid base is that the liquid should be compatible with the magnetic particle surface coating. While the liquid properties of the liquid carrier can change with the addition of the magnetic particles to form the ferromagnetic fluid, a sufficient number of compatible liquid carriers are available so that any reasonable combination of liquid carrier properties can be achieved.

The ferrohydrodynamic fluid 46 for the bearing assembly 10 of FIG. 1 can have as a liquid carrier base a dielectric heat transfer fluid having the following properties:

| Property | Value |
|---|---|
| Absolute viscosity at 170° F | 4.0 cp |
| −65° F | 25.0 cp |
| Pour Point | −140°F |
| Density at 77°F | 0.892 gm/cm³ |
| Coefficient of thermal expansion | 0.000576 cm³/cm³/°F |
| Vapor Pressure at 170°F | 5 mmHg |
| Saturation Magnetization | 200 gauss |

The magnet 32 of the bearing assembly 10 of FIG. 1, as previously described, develops a concentrated magnetic field at gap 42 and gap 44, and because of the previously described magnetic characteristics of the ferromagnetic fluid 46, the fluid develops a zero-leak seal at each of the gaps. Such magnetic seals can be leak-free to approximately 40 pounds per square inch absolute.

The magnetic seals developed at the gaps 42 and 44 eliminate contamination to the bearing from the environment that surrounds the bearing assembly, and also eliminate the requirement for a continuous lubricant supply since the magnetic seals contain the fluid lubricant in the bearing assembly over a wide temperature range.

Under certain stationary conditions, a bearing assembly such as the bearing assembly 10 of FIG. 1 is subjected to high temperature, high vacuum bakeout, i.e., non-operating outgassing, which would tend to boil off the ferromagnetic fluid 46. To prevent such boil off, the flange members 26 and 28 serve as limit stops to the outward expansion of the bimetallic pole shoe members 38 and 40 with increasing temperature. The resulting metal-to-metal seal prevents loss of ferromagnetic fluid during such outgassing.

An inwardly extending, non-magnetic center member 52, suitably connected to and nonrotatable with the magnet 32, extends into a channel generally defined by the intermediate land portion 16 and thrust pad members 22 and 24. The foregoing components comprise the stationary or stator portion of the spool bearing assembly 10 of FIG. 1.

The previously described rotating and stationary components of the spool bearing assembly 10 of FIG. 1 are maintained in a desired spaced apart relationship by the hydrodynamic pressure developed in the ferromagnetic fluid 46 that is between and in film contact with the confronting surfaces of the rotor and stator portions of the spool bearing assembly 10 of FIG. 1.

As illustrated by FIG. 1, the spool bearing assembly 10 can be regarded as a combination of a journal bearing and a double-acting thrust bearing. The journal bearing is formed by intermediate land portion 16 and the confronting inner surface 54 of center member 52. When a radial load is applied to shaft 14, the bearing becomes eccentric in a conventional manner so that the fluid thickness varies in fluid gap 56 between land portion 16 and inner surface 54 of center member 52. The viscous drag that moving land portion 16 exerts on the fluid 46 impels the fluid within the fluid gap 56 and builds up a hydrodynamic pressure which, in the steady state, balances the radial load applied to shaft 14.

Hydrodynamic journal bearings, however, are potentially unstable. This instability can be prevented by cutting grooves 58 into the confronting surface of the land portion 16 which act to dissipate the destabliizing forces. When the grooves 58 have a spiral characteristic, such as shown by FIG. 1, the grooves also act to impel the fluid 46 toward the center of the bearing, i.e., the center of the intermediate land portion 16, which further prevents seal leakage from the bearing assembly by decreasing the fluid pressure at the magnetic gaps 42 and 44.

Figure 2:
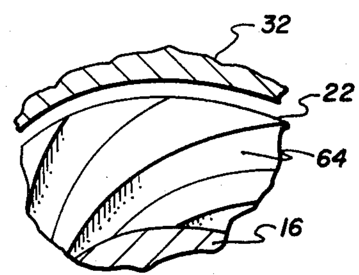
FIG. 2 is a sectional view, partly broken away, along the line 2—2 of FIG. 1.

The double-acting thrust bearing component of the bearing assembly 10 of FIG. 1 includes thrust pad members 22 and 24, and the confronting end surfaces 60 and 62, respectively, of center member 52. Thrust pad members 22 and 24 each have a pattern of spiral grooves 64 as shown by FIG. 2 cut into the surface so that the viscous drag of grooves 64 on the fluid 46 also impels the fluid toward the center of the bearing thus increasing the fluid pressure at or towards the bearing center while decreasing the fluid pressure at the gaps 42 and 44. Under an axial or thrust load, the rotor portion of the bearing assembly 10 will deflect so that the clearance between one of the thrust pad members, either 22 or 24, and the respective end surfaces 60 or 62 of center member 52 diminishes while the clearance at the other end increases. This causes the end with the diminished clearance to become more effective as a pump and produces a greater pressure rise while the pressure at the end with the larger gap diminishes. The steady state results when the force produced by the difference in the pressures at each end is equal and opposite to the applied load.

Figure 3:
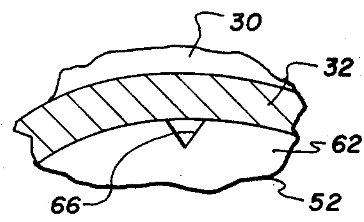
FIG. 3 is a sectional view, partly broken away, along the line 3—3 of FIG. 1.

It is necessary, however, to provide flow channels, such as flow channel 66 as illustrated by FIG. 3, between the end surfaces 60 and 62 of member 52 to prevent load support pressures developed under an axially load to the spool bearing assembly from forcing the fluid 46 out through the magnetic seal developed at gaps 42 and 44 and to provide axial stability. The similar flow channels 66 are suitably positioned and spaced apart in a predetermined relationship dependent upon the operating characteristics to which the spool bearing assembly is subjected.

Figure 4:
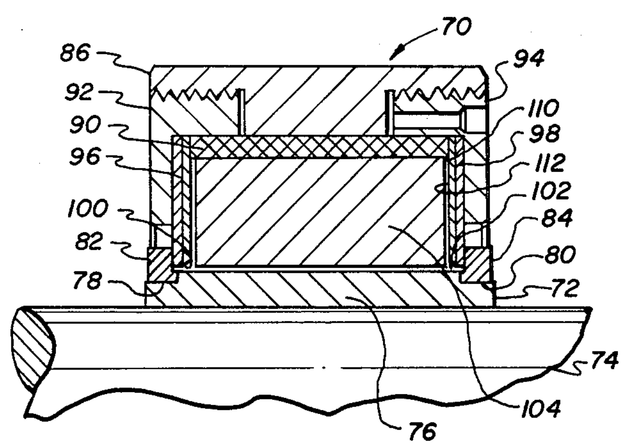
FIG. 4 is a sectional view, partly broken away, of another form of ferrohydrodynamic bearing of the invention.

Referring to FIG. 4, a journal bearing assembly 70 has journal member 72 fixed to a rotatable shaft 74 and rotatable therewith. The journal member 72 has an intermediate land portion 76 suitably formed between journal end portions 78 and 80. A pair of flanged members 82 and 84 are respectively positioned on and connected to journal end portions 78 and 80 so that the flanged members are rotatable with the journal member 72. The flanged members 82 and 84 extend outwardly for the purpose of assisting in the magnetic seal for the journal bearing assembly 70 similar to that previously described for the spool bearing assembly 10 of FIG. 1. The foregoing components rotatable with the shaft 74 comprise the rotating or rotor portion of the journal bearing assembly 70 as illustrated by FIG. 4.

The stationary or stator portion of the journal bearing assembly 70 of FIG. 4 has a support member 86 which can be connected to or be an integral part of a housing member (not shown). A magnet 90 is positioned within the support member 86 and retained therein by similar clamp nut members 92 and 94 that are connected to the support member 86. The clamp nut members 92 and 94, respectively, maintain bimetallic pole shoe members 96 and 98 in direct contact with the magnet 90 so that the inwardly extending pole shoe members develop a desired path for the magnetic flux field which is set up by the magnet, and further act to concentrate the magnetic flux at respective gaps 100 and 102. Magnetic seals are developed at each of the gaps 100 and 102 in a manner similar to that previously described for the bearing assembly 10 of FIG. 1 so that the concentrated magnetic flux field at each of the gaps develops a zero-leak seal with the desirable advantages as previously set forth in the description of the bearing assembly 10.

The bimetallic pole shoe members 96 and 98 not only function as flux concentrators but also function as volume compensators similar to that previously described for the bearing assembly 10 of FIG. 1. Further, the pole shoe members 96 and 98 develop the previously described metal-to-metal seal with flanged members 82 and 84 which act as stops. An inwardly extending center member 104 is suitably connected to and nonrotatable with the magnet 90. The foregoing components comprise the stationary or stator portion of the journal bearing assembly 70 of FIG. 4.

During operation, the rotor portion and stator portion of the journal bearing assembly 70 of FIG. 4 are maintained in a desired spaced apart relationship by a pressurized ferromagnetic fluid 110 that completely fills a chamber 112 which is generally developed in the confines or boundaries as defined by the gaps 100 and 102. The ferromagnetic fluid 110 is maintained in film contact with the confronting surfaces of the center member 104 and the intermediate land portion 76 of the previously described rotor and stator portions of the journal bearing assembly 70.

The intermediate land portion 76 of the journal bearing assembly 70 of FIG. 4 has an external surface which is suitably formed with a plurality of inwardly directed grooves (not shown) that are both structurally and functionally similar to the inwardly directed grooves as previously described for the spool bearing assembly 10 of FIG. 1.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A bearing assembly comprising:

a. bearing means for the support of a load including at least first and second members developing a chamber having a first volume, b. magnetizable fluid means within said chamber developing a lubricant film contact with said first and second members, c. magnetic seal means acting upon and retaining said magnetizable fluid within said chamber, and d. compensation means automatically adjusting said chamber volume in response to temperature from said first volume to a second volume so that the developed lubricant film contact is maintained without leakage of said fluid means from the bearing assembly.

2. The bearing assembly of claim 1 in which said magnetic seal means includes:

a. magnet means on said second member developing a magnetic flux field, and b. a magnetic flux concentrator portion of said compensator means spaced apart from said first member concentrating the developed magnetic flux field through said magnetizable fluid means at and generally adjacent said concentrator portion.

3. The bearing assembly of claim 2 in which said magnet means is a permanent magnet.

4. The bearing assembly of claim 2 in which said magnet means is an electromagnet.

5. The bearing assembly of claim 1 in which said magnetizable fluid means is a ferromagnetic fluid.

6. The bearing assembly of claim 5 in which said ferromagnetic fluid includes:

a. a carrier liquid, and b. magnetic particles of subdomain size collodially dispersed in said carrier liquid by Brownian movement.

7. The bearing assembly of claim 6 in which said magnetic particles are magnetic ferrite.

8. The bearing assembly of claim 1 in which said pump means includes a plurality of selectively spaced grooves formed in at least one of said first and second members and oriented to force said fluid means into the developed lubricant film contact.

9. The bearing assembly of claim 8 in which said first member includes an intermediate portion having said grooves and said second member is positioned outwardly adjacent to said intermediate portion and operatively spaced therefrom by said developed lubricant film contact therebetween so that a desired radial support is developed by the bearing assembly.

10. The bearing assembly of claim 9 in which said first member further includes thrust means having said grooves and being positioned laterally adjacent to said second member and operatively spaced therefrom by said developed lubricant film contact therebetween so that both a desired radial and axial support are developed by the bearing assembly.

11. The bearing assembly of claim 10 in which said thrust means includes at least first and second thrust pad members with said intermediate portion positioned therebetween.

12. The bearing assembly of claim 8 in which said grooves are outwardly diverging in the direction of rotation of said rotatable one of said first and second members.

13. The bearing assembly of claim 2 in which said bearing means includes limit stop means selectively engaged by said compensator means so that a resulting fluid seal developed therebetween contains said fluid means under relatively high temperature and high vacuum stationary operation of the bearing assembly.

14. The bearing assembly of claim 13 in which said compensator means includes at least first and second flexible members having a predetermined deflection in response to temperature so that said chamber volume is automatically adjusted.

15. The bearing assembly of claim 14 in which said first and second members are bimetallic elements.

16. The bearing assembly of claim 14 in which said compensator means further includes movable clamp members selectively adjustable to control said deflection of said first and second flexible members.

17. The bearing assembly of claim 2 in which said compensator means develops a magnetic flux path for said magnetic flux field between said magnet means and said magnetic flux concentrator portion.

18. The bearing assembly of claim 2 in which said second volume is greater than said first volume.

19. The bearing assembly of claim 2 in which said second volume is less than said first volume.

* * * * *